United States Patent
Cheng

(10) Patent No.: US 11,012,664 B2
(45) Date of Patent: May 18, 2021

(54) REMOTE CONTROLLED VIDEO MESSAGING SESSION

(71) Applicant: Viewabo, Inc, Palo Alto, CA (US)

(72) Inventor: George Shih-Hao Cheng, Atherton, CA (US)

(73) Assignee: Viewabo, Inc., Palo Alto, CA (US)

( * ) Notice: Subject to any disclaimer, the term of this patent is extended or adjusted under 35 U.S.C. 154(b) by 0 days.

(21) Appl. No.: 16/898,819

(22) Filed: Jun. 11, 2020

(65) Prior Publication Data

US 2020/0413006 A1    Dec. 31, 2020

Related U.S. Application Data

(60) Provisional application No. 62/867,561, filed on Jun. 27, 2019.

(51) Int. Cl.
*H04N 7/14*      (2006.01)
*G06F 3/0481*    (2013.01)

(52) U.S. Cl.
CPC ........... *H04N 7/142* (2013.01); *G06F 3/0481* (2013.01)

(58) Field of Classification Search
CPC combination set(s) only.
See application file for complete search history.

(56) References Cited

U.S. PATENT DOCUMENTS

| | | | |
|---|---|---|---|
| 2008/0059986 A1 | 3/2008 | Kalinowski et al. | |
| 2010/0053347 A1* | 3/2010 | Agarwala | H04N 5/23267 348/208.99 |
| 2013/0141456 A1* | 6/2013 | Sokolov | G06F 3/1454 345/620 |
| 2014/0375749 A1 | 12/2014 | Kay et al. | |
| 2016/0173825 A1 | 6/2016 | Polyakov et al. | |
| 2016/0180743 A1* | 6/2016 | Ahmad | G16H 30/40 434/262 |
| 2016/0360160 A1 | 12/2016 | Eizenberg | |
| 2017/0272551 A1* | 9/2017 | Johnson | H04L 67/42 |
| 2018/0295169 A1 | 10/2018 | McLennan et al. | |
| 2019/0037173 A1 | 1/2019 | Lee et al. | |
| 2019/0373216 A1* | 12/2019 | Cutler | H04N 7/142 |

OTHER PUBLICATIONS

PCT International Search Report and Written Opinion, PCT Application No. PCT/US2020/037425, dated Aug. 31, 2020, 17 pages.

* cited by examiner

*Primary Examiner* — Phung-Hoang J Nguyen
(74) *Attorney, Agent, or Firm* — Fenwick & West LLP

(57) ABSTRACT

A video messaging system facilitates a video messaging session between a client device and a remote device. A remote device provides information (e.g., a link) to a client device for connecting to a video messaging session. The client device uses the provided information to connect to the video messaging session between the client device and the remote device. The video messaging session generally includes two-way communication, with at least video information being transmitted by the client device to the remote device, and instructions describing video operations being transmitted by the remote device to the client device. The video operations may include annotating the video, rewinding the video, pausing the video, and various other modifications to the video. The video messaging system may mirror operations performed on one device (e.g., the remote device) on the other device (e.g., the client device) in the video messaging session.

20 Claims, 6 Drawing Sheets

REMOTE CONTROLLED VIDEO MESSAGING SESSION

CROSS REFERENCE TO RELATED APPLICATIONS

This application claims the benefit of and priority to U.S. Provisional Application No. 62/867,561, filed Jun. 27, 2019, the entire contents of which are hereby incorporated by reference for all purposes as if fully set forth herein.

TECHNICAL FIELD

The subject matter described generally relates to video messaging, and more specifically to remote controlled video messaging sessions.

BACKGROUND

Customer service interactions, such as voice calls or online chat sessions, involving issues with physical products (e.g., computer hardware or other devices) traditionally require a customer to describe a configuration of a physical product to a customer service representative (e.g., a hardware configuration). Likewise, the customer service representative is required to ask questions about the configuration or describe a potential reconfiguration solution to the customer. However, this process can be awkward and confusing for a customer not otherwise well-versed in the physical product, which can increase a length and/or decrease a likelihood of success of a customer service call. Existing systems do not provide a solution to overcome these limitations of customer service interactions.

SUMMARY

In various embodiments, a video messaging system facilitates a video messaging session between a client device and a remote device. A remote device provides information to a client device for connecting to a video messaging session, such as a link provided via text message, email, or within an application running on the client device (such as an instant messaging app or a web browser). The client device uses the provided information to connect to the video messaging session between the client device and the remote device. The video messaging session generally includes two-way communication, with at least video information being transmitted by the client device to the remote device, and instructions describing video operations being transmitted by the remote device to the client device.

In some embodiments, the remote device and/or the client device perform video operations on the captured video which modify the captured video. Modifications of the captured video may include adding annotations to the captured video, freezing the captured video, rewinding the captured video, and the like. The video messaging system may mirror the modifications resulting from video operations on one device in the video messaging session (e.g., the remote device) on the other device (e.g., the client device) based on the provided instructions.

DETAILED DESCRIPTION

System Architecture

Figure 1:
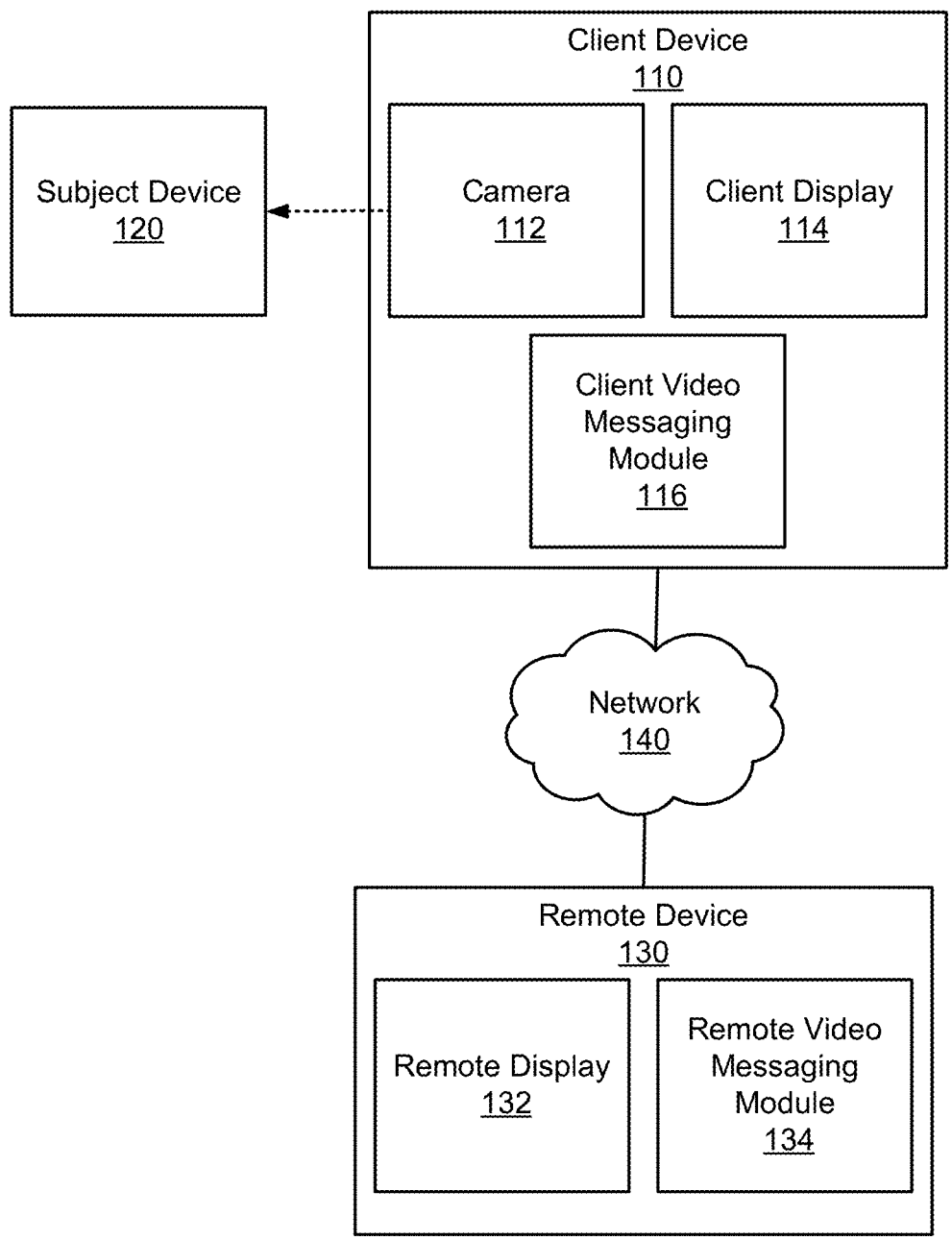
FIG. 1 is a block diagram of a system environment for a video messaging system, according to an embodiment.

FIG. 1 is a block diagram of a system environment for a video messaging system, according to an embodiment. The system environment 100 includes a client device 110 and a remote device 130 communicatively coupled via a network 140, and a subject device 120. An exemplary context in which the system environment 100 may be used is a customer service context in which a video messaging session is facilitated between a customer using the client device 110 (i.e., a client user) and a customer support agent using the remote device 130 (i.e., a remote user). In other embodiments, the system environment 100 may be used in other contexts, such as interactions between buyers and sellers in an online marketplace, interactions between homeowners and service workers (such as cleaners, construction teams, and the like), and interactions between travelers and travel agents. Additionally, in other embodiments the system environment 100 may include additional or different components relative to those depicted in FIG. 1.

The client device 110 facilitates a video messaging session between the client device 110 and the remote device 130 for a user of the client device 110. The client device 110 includes a camera 112, a client display 114 (e.g., a screen), and a client video messaging module 116. The client device 110 may initiate a video messaging session with the remote device 130. For example, the client device 110 may initiate the video messaging session in response to an interaction from a user of the client device 110 with a user interface displayed on the client display 114. During a video messaging session, the client device 110 may capture video using the camera 112 and provide the captured video to the remote device 130 over the network 140. The client device 110 may include various electronic devices operated by a client user, including a mobile computing device (e.g., a smartphone or tablet), a smartwatch, a laptop computer, or a desktop computer.

The client video messaging module 116 communicates with the remote device 130 over the network 140. The client video messaging module 116 may process video captured by the camera 112, for instance by adding graphical elements (e.g., annotations) to the video or otherwise performing operations on the captured video. The client video messaging module 116 provides the captured video to the remote device 130. The client video messaging module 116 may further provide other data to the remote device 130, such as text (e.g., chat messages) and audio (e.g., client user voice recordings). The client video messaging module 116 may provide a user interface for display on the client display 114. The user interface provided by the client video messaging module 116 may allow a client user to initiate a video messaging session with the remote device 130, to modify the captured video during a video messaging session, to terminate and/or pause the video messaging session, and to otherwise allow the client user to communicate with a remote user of the remote device 130. The client video messaging module 116 is described in greater detail below with reference to FIG. 2A.

The subject device 120 is a device captured by the client device 110 using the camera 112 during a video messaging session, as indicated by the dotted line. The subject device 120 may be a device for which the client user desires assistance (e.g., operating the subject device 120, assembling the subject device 120, etc.). In the exemplary case where the remote user is a customer service agent, the subject device 120 may be a physical product for which the customer service agent can provide assistance. It should be noted that although the term "subject device" is used in the embodiment of FIG. 1, in practice the remote-controlled video messaging session described herein can include video captured of any object or subject matter (such as an automobile, plumbing within a house, groceries on a shelf of a store, and the like).

The remote device 130 facilitates a video messaging session between the client device 110 and the remote device 130 for a user of the remote device 130. The remote device 130 includes a remote display 132 and a remote video messaging module 134. The remote device 130 may receive a request to initiate a video messaging session with the client device 110. The remote device 130 may initiate the video messaging session based on the request, such as in response to an interaction from a remote user with a user interface displayed on the remote display 132. During a video messaging session, the remote device 130 may receive video captured by the client device 110. Furthermore, the remote device 130 may modify the video displayed by the remote display 132 or otherwise perform operations on the received video, and/or may transmit instructions to the client device 110 to perform similar operations on the video displayed by the client display 114. The remote device 130 may include various electronic devices operated by a remote user, including a mobile computing device (e.g., a smartphone or tablet), a laptop computer, a desktop computer, a computer terminal, or a web server.

The remote video messaging module 134 communicates with the client device 110 over the network 140. In particular, the remote video messaging module 134 may enable the client device 110 to join a video messaging session initiated by the remote video messaging module 134. For example, the remote video messaging module 134 may provide a link (such as a hyperlink or a URL), token, interface, or other information for connecting to a video messaging session to the client device 110. Similar to the client video messaging module 116, the remote video messaging module 134 may process video received from the client device 110 and provide information to the client device 110, such as instructions to modify the captured video, text (e.g., chat messages), and audio (e.g., remote user voice recordings). The remote video messaging module 134 may provide a user interface for display on the remote display 132. The user interface provided by the remote video messaging module 134 may allow a remote user to perform the same and/or similar functions as those described above in relation to the client video messaging module 116, and may also allow for different and/or additional functions. The remote video messaging module 134 is described in greater detail below with reference to FIG. 2B.

The network 140 may comprise any combination of local area and/or wide area networks, using wired and/or wireless communication systems. In one embodiment, the network 140 uses standard communications technologies and/or protocols. For example, the network 140 includes communication links using technologies such as Ethernet, 802.11 (WiFi), worldwide interoperability for microwave access (WiMAX), cellular networks (e.g., 3G, 4G, 5G), code division multiple access (CDMA), digital subscriber line (DSL), Bluetooth, Near Field Communication (NFC), Universal Serial Bus (USB), or any combination of communication protocols (e.g., TCP/IP, HTTP, S1v1TP, FTP), encodings or formats (e.g., HTML, JSON, XML), and/or protection schemes (e.g., VPN, secure HTTP, SSL). In some embodiments, all or some of the communication links of the network 140 may be encrypted using any suitable technique or techniques.

Figure 2A:
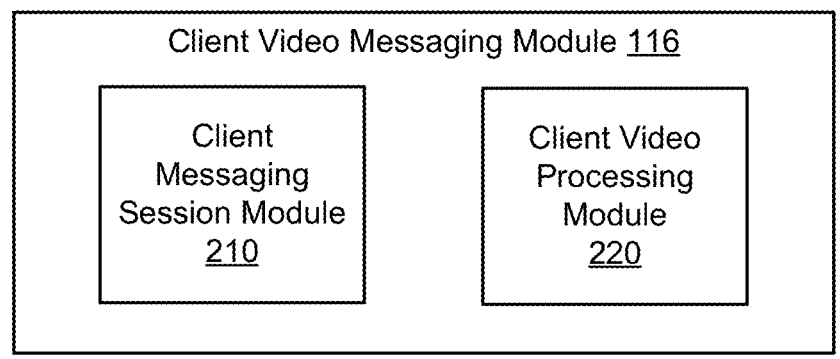
FIG. 2A is a block diagram of a client video messaging module, according to an embodiment.

FIG. 2A is a block diagram of a client video messaging module 116, according to an embodiment. The client video messaging module 116 includes a client messaging session module 210 and a client video processing module 220. In other embodiments, the client video messaging module 116 may include additional and/or different components.

The client messaging session module 210 communicates with the remote device 130 (e.g., via the remote messaging session module 230). In particular, the client messaging session module 210 may connect to a video messaging session with the remote device 130. Through the video messaging session, the client messaging session module 210 may provide video captured by the client device 110 (e.g., using the camera 112) to the remote device 130. The captured video provided by the client messaging session module 210 may by modified (e.g., by the client video processing module 220, as described below). Alternatively, the client messaging session module 210 may provide instructions to the remote device 130 to modify the captured video received from the client device 110 prior to display. The client messaging session module 210 may provide a user interface associated with the video messaging session for display by the client display 114 (i.e., a client interface). The client interface may include the video captured by the client device 110 (e.g., by the camera 112). Additionally, the client interface may include elements allowing the client user to modify the captured video, such as by annotating the video with one or more graphical elements. The client messaging session module 210 may further transmit the captured video to the remote device 130. Additionally, the client messaging session module 210 may receive information from the remote device 130, such as instructions for modifying the captured video as displayed by the client device 110, which is described in greater detail below with reference to FIG. 2B. In response to instructions from the remote device 130 and/or interactions by the client user with the client device 110, the client messaging session module 210 may provide instructions to the client video processing module 220 to modify the captured video, as described in greater detail below.

In some embodiments, the remote device 130 may be associated with a network service (e.g., provided by one or more servers), such as a website or web application. In this case, the client messaging session module 210 may connect to the video messaging session using an interface provided by the network service (e.g., a user interface, an application programming interface (API), etc.). The client messaging session module 210 may request to initiate the video messaging session through the interface, such as in response to a user interaction with the client device 110. In this case, the client messaging session module 210 may receive information from the network service and/or the remote device 130 enabling the client messaging session module 210 to join a video messaging session. For example, the client messaging session module 210 may receive a selectable link for presentation to the client user (e.g., via the client display 114). Responsive to an interaction with the link, the client messaging session module 210 may connect to a video messaging session provided by the network service and display a user interface associated with the video messaging session. Additionally, the client messaging session module 210 may begin capture of video (e.g., using the camera 112) based on an interaction with the link and/or provide the captured video to the remote device 130. Initiating the video messaging session via the remote device 130 is described in greater detail below with reference to FIG. 2B.

In some embodiments, the client messaging session module 210 may connect to a video messaging session (e.g., using a link provided by the remote device 130) using internet video communication protocols, such as WebRTC. In such embodiments, video captured by the camera 112 of the client device 110 can be displayed by both the client device 110 and the remote device 130 via a web browser or other application that utilizes video APIs. Such embodiments beneficially enable the video messaging system to be used by the client user without having to install additional software (such as a dedicated video messaging session application). Accordingly, when connecting to the video messaging session, the client messaging session module 210 is directed to an IP address that, via one or more API calls, initiates the capture of video by the client device 110 and the subsequent transmission of the video to the remote device 130.

In some embodiments, the client messaging session module 210 displays a client interface including the captured video, modifications to the received video received from the remote device 130, and/or elements allowing the client user to perform graphical operations on the captured video. (e.g., adding annotations, rewinding the video, pausing the video, etc.). Graphical operations and other modifications of the captured video are described in greater detail below with reference to the remote messaging session module 230.

In some embodiments, the video messaging session includes audio, enabling the client user and the remote user to speak during the video messaging session. In this case, the client messaging session module 210 provides audio signals to the remote device 130 and receives audio signals from the remote device 130. In other embodiments, the video messaging session does not include audio—in such embodiments, audio signals can be transmitted via a separate audio session, for instance via a phone call between the client user and the remote user. For example, the client user can call a customer service representative (e.g., the remote user), and the customer service representative can send the link to establish the video messaging session to the client device 110. After the client user initiates the video messaging session by selecting the link, the call between the client user and the customer service representative can continue, allowing the client user to speak to the customer service representative via the call and enabling the customer service representative to view video captured by the client device 110 via the video messaging session. In the same or different embodiments, the video messaging session may facilitate other means of communications, such as text messaging.

The client video processing module 220 modifies video captured by the client device 110. The client video processing module 220 may modify the captured video as displayed by the client device 110 (e.g., on the client display 114), such as rewinding the video or adding an annotation to one or more frames of the video. The client video processing module 220 may modify the video displayed by the client device 110 in response to instructions from the client messaging session module 210, as described above. The instructions received by the client video processing module 220 may describe operations performed by a remote user on the captured video as displayed by the remote device 130. In this case, the client video processing module 220 may modify the video displayed by the client device 110 by performing the same operations on the video displayed by the client device 110. For instance, if the operations performed by remote user rewind the video to a particular frame, freeze the video, and add a graphical outline (or "box") around a portion of the frame, the client video processing module 220 can rewind the video displayed by the client device 110 to the particular frame, freeze the video, and add the graphical outline around the portion of the frozen frame.

In some embodiments, video displayed by the client device 110 on the client display 114 is a real-time video stream as it is captured by the camera 112 (as opposed to video captured by the client device 110, then transmitted to the remote device 130, and subsequently re-transmitted back to the client device 110 for display on the client display 114). In such embodiments, modifications to the video made by the remote device 130 are communicated to the client device 110 as instructions to be performed by the client video processing module 220. For modifications involving the rewinding of video, the client video processing module 220 may be configured to buffer video captured by the client device 110 for a period of time, enabling the client video processing module 220 to retrieve previously captured video from the buffer when instructed to rewind the video. For example, the remote device 130 may also buffer the captured video, and in response to a rewind operation by the remote user the remote device 130 may transmit an identifier of a frame (e.g., a frame number) in the buffered video to which the remote user rewound the captured video. In this case, the client video processing module 220 may use the received identifier to rewind the captured video as displayed by the client display 114 to the corresponding frame. By buffering the captured video and communicating video modifications using minimal data such as an identifier or other signal, the client device 110 and the remote device 130 may reduce latency for the video messaging session.

Due to the lag inherent in video transmission, certain operations performed by the remote device 130 on the captured video (such as the inclusion of annotations) may be displayed by the client device 110 on video several frames after the video is displayed by the remote device 130 on which the operations to include the annotations were performed. In such embodiments, the direction or field of view of the video captured by the client device 110 may have shifted or changed significantly enough that the annotations are no longer relevant to the video displayed by the client device 110. For instance, a remote user can highlight a particular motherboard connector interface within video displayed by the remote device 130—if the field of view of the camera 112 shifts significantly between the time the highlight operation is performed and the time the client video processing module 220 receives an instruction to perform the same highlight operation, a portion of the video that does not include the motherboard connector may be highlighted, and indeed the motherboard connector may no longer be displayed within the video.

To account for this, the client video processing module 220 or the client messaging session module 210 may display video captured by the client device 110 at a delay selected to account for the lag between the client device 110 and the remote device 130. Alternatively, the remote device 130 may transmit the entire video in conjunction with information describing the performed operations, and the client device 110 may display the video received from the remote device 130 and modified based on the performed operations.

Figure 2B:
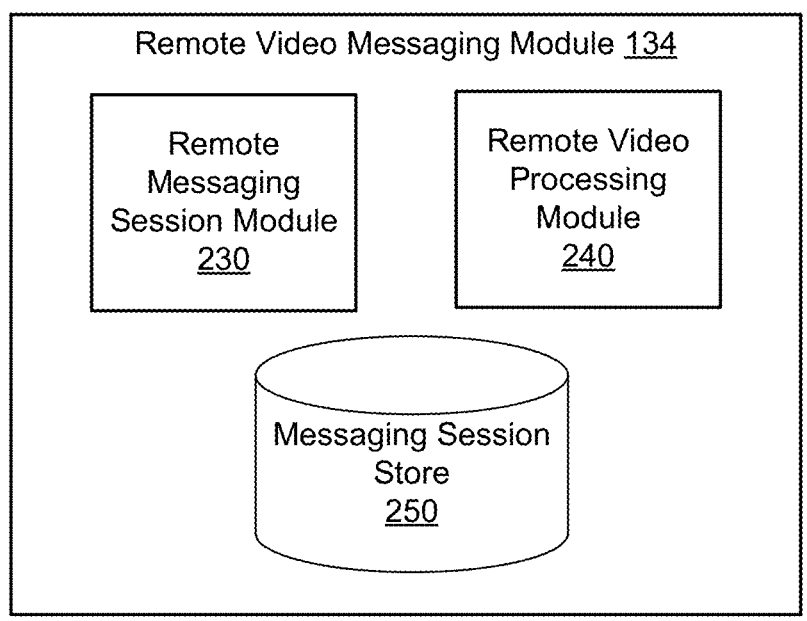
FIG. 2B is a block diagram of a remote video messaging module, according to an embodiment.

FIG. 2B is a block diagram of the remote video messaging module 134, according to an embodiment. The remote video messaging module 134 includes a remote messaging session module 230, a remote video processing module 240, and a messaging session store 250. In other embodiments, the remote video messaging module 134 may include additional and/or different components.

The remote messaging session module 230 communicates with the client device 110 (e.g., via the remote messaging session module 230). In particular, the remote messaging session module 230 may perform similar processes as those described above for the client video processing module 220 for the remote device 130 side of a video messaging session. As described above in relation to the client messaging session module 210, the remote messaging session module 230 may connect to a video messaging session with the client device 110. In particular, the remote messaging session module 230 may receive a request from the client device 110 (e.g., from the client video messaging module 116) to initiate a video messaging session.

In response to the request, the remote messaging session module 230 may initialize a video messaging session. For example, the remote messaging session module 230 may use an internet video communication protocol to request video capture by the client device 110 over the network 140. After initializing the video messaging session, the remote messaging session module 230 may provide information to the client device 110 enabling the client device 110 to provide video captured using the camera 112 through the video messaging session. For example, the remote messaging session module 230 may provide a URL link to the client device 110 in a text message, email, web page, application interface, or the like. Through the video messaging session, the remote messaging session module 230 may receive video captured by the client device 110 and/or information describing modifications to the captured video. Similarly to the client messaging session module 210, as described above, the remote messaging session module 230 may provide a user interface for display by the remote display 132 (i.e., a remote interface).

The remote interface may include the video received from the client device 110, modifications to the received video, and/or elements allowing the remote user to modify the captured video (e.g., adding annotations, rewinding the video, pausing the video, etc.). In particular, the remote interface may include elements allowing the remote user to perform one or more graphical operations on the captured video. For instance, the remote interface may allow the remote user to zoom in on a portion of the video, adjust a brightness of the video, or pan the video. In the same or different embodiments, the remote interface may allow the remote user to freeze the video on a particular frame, rewind or fast forward the video, play the video in slow motion, and the like. In some embodiments, the remote interface allows the remote user to perform a combination of these operations. For example, the remote user may perform a series of interactions with the remote interface which results in operations including rewinding the video displayed by the remote device 130 to a particular frame, freezing the video at that frame, and adding an annotation highlighting a particular portion of the video. This enables the remote user to navigate to a relevant portion of the video and flag a portion of the video for the client user. Such operations beneficially allow the user of the remote device 130 to account for an inconsistent capture of video by the client device 110 due to behavior of the client user, for instance when the client user moves the client device 110 and/or the camera 112 around, changes the field of view of the camera 112 too quickly, or points the camera 112 in a direction other than a direction desired by a remote user. As described above with reference to the client messaging session module 210, the client device 110 may display a client interface which allows the client user to perform the same or different operations as the remote interface.

In some embodiments, the remote interface includes elements allowing the remote user to record the captured video, store the recorded video in the messaging session store 250, and/or share the captured video with one or more other devices. The remote messaging session module 230 may provide instructions to the client video processing module 220 to modify the captured video, as described in greater detail below with reference to the remote video processing module 240.

In some embodiments, the remote messaging session module 230 may provide an interface for display to the client device 110 in response to an interaction with a link requesting permission to access the camera 112 and/or receive video captured by the camera 112 (i.e., a permissions interface). In this case, the client device 110 may begin capturing video with the camera 112 based on an interaction by the user of the client device 110 with the permissions interface, such as agreeing to grant access to the camera 112 by the remote messaging session module 230 and/or other component of the system environment 100 associated with the video messaging session. The permissions interface may further include a request to access a microphone of the client device 110 in order to receive audio from the client user. Furthermore, the permissions interface may include additional information for the client user to review, such as terms, conditions, and/or other privacy policies associated with the video messaging session.

In some embodiments, the remote messaging session module 230 provides instructions to the client device 110 to mirror operations performed by the remote device 130 on the captured video. As such, the remote user may be able to display and indicate a portion of the video captured by the client device 110 relevant to a subject of the video messaging session between the remote user and the client user. For instance, in the context of a customer service call about computer hardware, a customer service representative (e.g., remote user) can cause the client device 110 to display a portion of video captured by the client device 110, and can highlight a particular portion of the computer hardware within the displayed portion of video in order to suggest the client user interact with the portion of the computer hardware.

In some embodiments, the remote messaging session module 230 initiates the video messaging session or other communications (e.g., voice calls, text-based chats, etc.) within the context of a ticketing system. For instance, the remote messaging session module 230 may assign each request from the client device 110 for a video messaging session to a ticket corresponding to a subject matter of the video messaging session. Additionally, the remote messaging session module 230 may assign video messaging sessions or other communications from the same client device 110 regarding the same subject to the same ticket, such that all communications associated with the ticket can be viewed within a centralized interface. Furthermore, the remote messaging session module 230 may store the communications assigned to a ticket in the messaging session store 250. The remote messaging session module 230 may provide the centralized interface for viewing previous communications for a particular ticket stored in the messaging session store 250. For example, the remote messaging session module 230 may provide mechanisms enabling a client user or a remote user to view the video of previous video messaging sessions associated with a ticket, allowing for quality assurance auditing and review by individuals associated with the remote video messaging module 134, and enabling training of new service representatives associated with the remote video messaging module 134.

In some embodiments, the remote messaging session module 230 provides information to an additional device (e.g., another remote device used by another remote user) enabling the additional device to connect to the video messaging session and/or to view some or all of the video captured by the client device 110. For example, a customer service representative may be unable to successfully assist the client user regarding a question about a product or service. In this case, the customer service representative may wish to consult an additional customer service representative or other customer service team member regarding the question. The remote device 130 may then provide a link to an additional remote device of the additional customer service representative so the additional remote device can join the video messaging session and/or view the video captured by the client device 110. The additional remote device may receive video which has been modified by either the client device 110 or the remote device 130.

In some embodiments the remote messaging session module 230 performs processes to account for lag. In particular, the remote messaging session module 230 may send instructions to the client device 110 to prompt the client user to freeze video displayed by the client device 110. The remote messaging session module 230 may then receive the frozen frame of video displayed by the client device 110 and display the frozen frame, allowing the remote user to perform an operation on the frozen frame. The remote messaging session module 230 may then provide instructions to the client device 110 describing the operation, which the client device 110 may then perform on the frozen frame as displayed by the client device 110 for viewing by the client user.

The remote video processing module 240 modifies video received from the client device 110. In particular, the remote video processing module 240 may perform similar processes as those described above for the client video processing module 220 for the remote device 130 side of a video messaging session. The remote video processing module 240 may modify the video received from the client device 110 as displayed by the remote device 130 (e.g., on the remote display 132) is accordance with interactions by the remote user with the remote interface or instructions received from the client device 110. The remote video processing module 240 may modify the video displayed by the remote device 130 in response to instructions from the remote messaging session module 230, such as based on interactions by the remote user with the remote interface. The instructions received by the remote video processing module 240 may describe interactions by the remote user with the remote interface indicating intended operations to be performed on the captured video. In this case, the remote video processing module 240 may modify the video displayed by the remote device 130 by modifying the video in accordance with the instructions. The remote video processing module 240 may alternatively receive instructions describing operations performed by the client device 110 on the captured video (e.g., based on interactions by the client user with the client interface). In this case, the remote video processing module 240 may modify the video for display by the remote device 130 to mirror the operations performed by the client device 110, similarly to the client video processing module 220.

In some embodiments, the remote video processing module 240 processes the video received from the client device 110 before it is displayed by the remote device 130. In particular, the remote video processing module 240 may stabilize the video in order to account for movement of the camera 112 by the client user. The remote video processing module 240 may stabilize the video using various techniques, such as performing a digital zoom on the video (e.g., enlarging the video), rotating the video to counter rapid movements of the camera 112, and the like.

Figure 3:
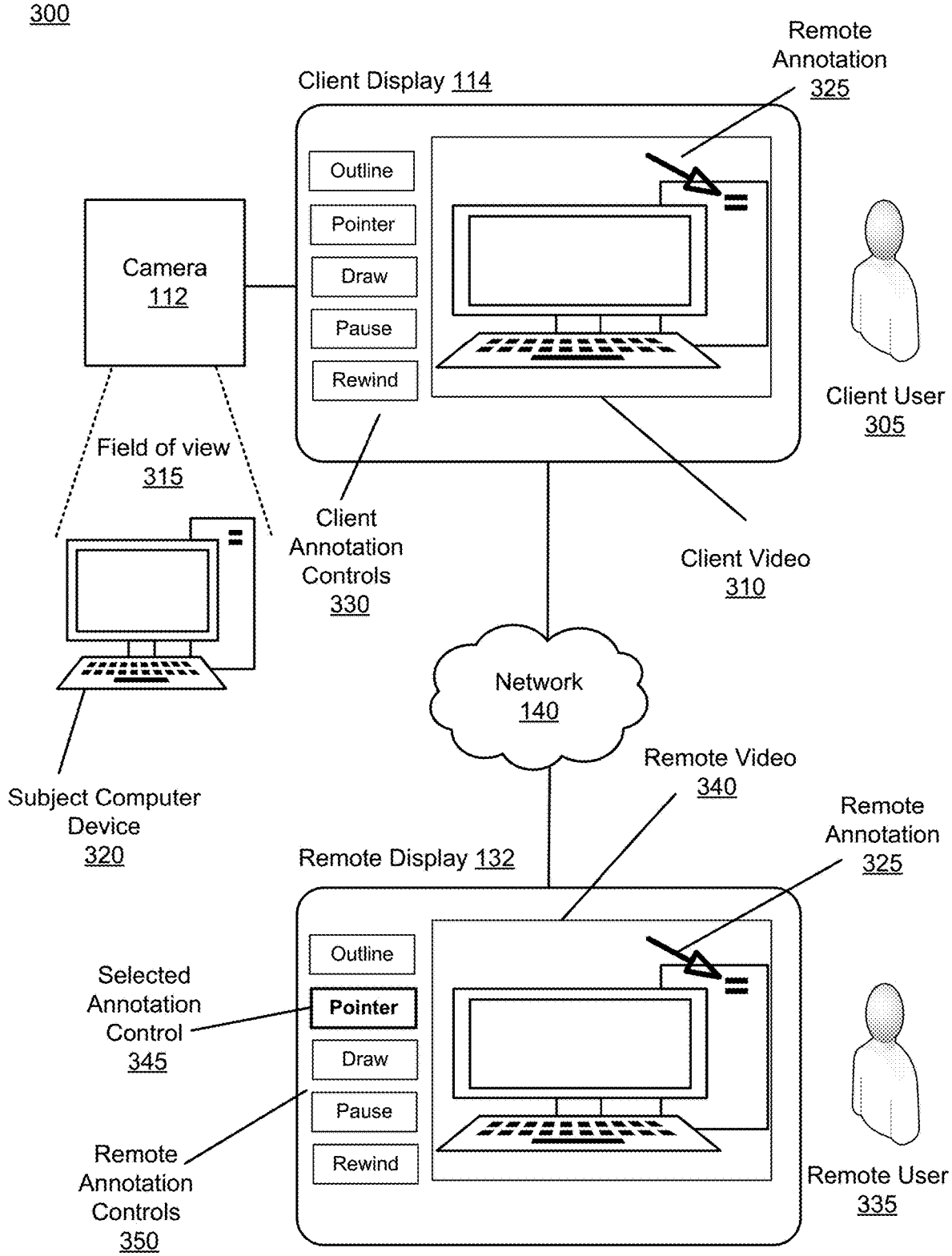
FIG. 3 illustrates a video messaging session between a client device and a remote device, according to an embodiment.

FIG. 3 illustrates a video messaging session 300 between the client device 110 and the remote device 130, according to an embodiment. As part of the video messaging session 300, the client display 114 displays a client interface for the client user 305 including a client video 310 captured by the camera 112 and client annotation controls 330. The client video 310 depicts a subject computer device 320 which is within the field of view 315 of the camera 112. For example, the subject computer device 320 may be a desktop computer owned by the client user 305. Although a computer is illustrated as the subject matter of the video messaging session 300, it should be noted that in other examples the video captured by the client device 110 may include anything within the field of view 315 of the camera 112.

The client video 310 is modified to additionally include a remote annotation 325 (e.g., a pointer annotation). In the example depicted in FIG. 3, the client device 110 added the remote annotation 325 to the client video 310 based on instructions received by the client device 110 to mirror operations corresponding to an interaction by the remote user 335 with the remote annotation controls 350. In other examples, the remote annotation 325 may be a different annotation (e.g., a highlight, a drawing, an augmented reality element, etc.), and/or may have been added to the client video 310 based on an interaction by the client user 305 with the client annotation controls 330. The client annotation controls 330 as depicted in FIG. 3 include buttons for adding an outline annotation to the client video 310, adding a pointer annotation to the client video 310, adding drawn annotations (e.g., free-form drawings) to the client video 310, pausing the client video 310, and rewinding the client video 310. In other embodiments, the client annotation controls 330 may include additional controls for performing other operations and/or be represented differently on the client interface as displayed by the client display 114.

As another part of the video messaging session 300, the remote display 132 displays a remote interface for the remote user 335 including a remote video 340 received by the remote device 130 over the network 140 and remote annotation controls 350. The remote video 340 depicts the same content as the client video 310. In particular, the remote device 130 has modified the remote video 340 to include the remote annotation 325 in response to an interaction by the remote user 335 with the selected annotation control 345 (as indicated by the bold outline) included in the remote annotation controls 350. As depicted in FIG. 3, the client annotation controls 330 and the remote annotation controls 350 include the same elements. In other examples, the client annotation controls 330 and the remote annotation controls 350 may include different elements for adding annotations to the client video 310 and the remote video 340 and/or otherwise interacting with the video messaging session 300.

In other embodiments, the client interface as displayed by the client display 114 and/or the remote interface as displayed by the remote display 132 may include additional interface elements. For example, the client interface may include elements for requesting to initiate a video messaging session 300 with the remote device 130. As another example, the remote interface may include elements for initiating the video messaging session 300, sending information to the client device 110 to connect to the video messaging session 300, creating a ticket for the video messaging session 300, recording the remote video 340, terminating the video messaging session 300, or providing information to another remote device regarding the video messaging session 300 (e.g., another link to join the video messaging session 300).

EXAMPLE ANNOTATIONS

Figure 4A:
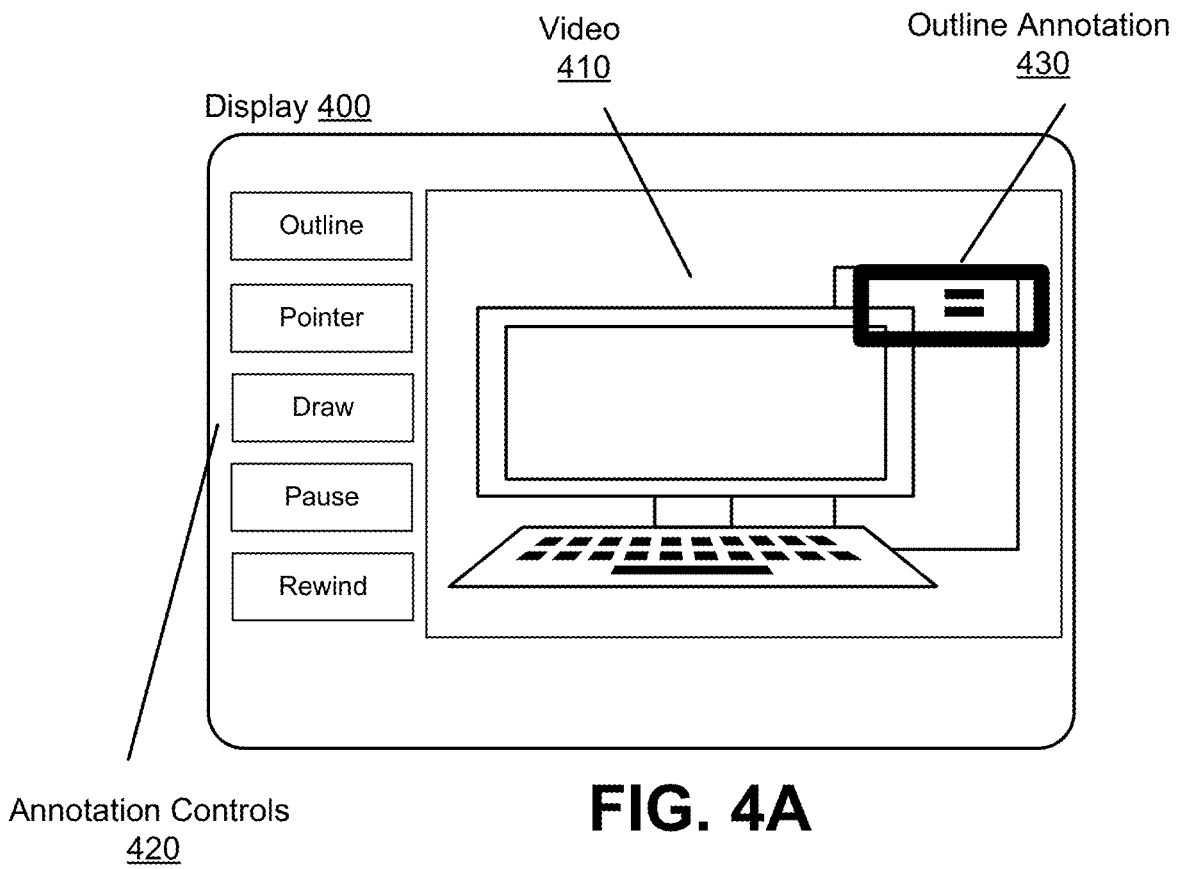
FIG. 4A illustrates a remote-controlled video messaging interface including an outline annotation, according to an embodiment.
Figure 4B:
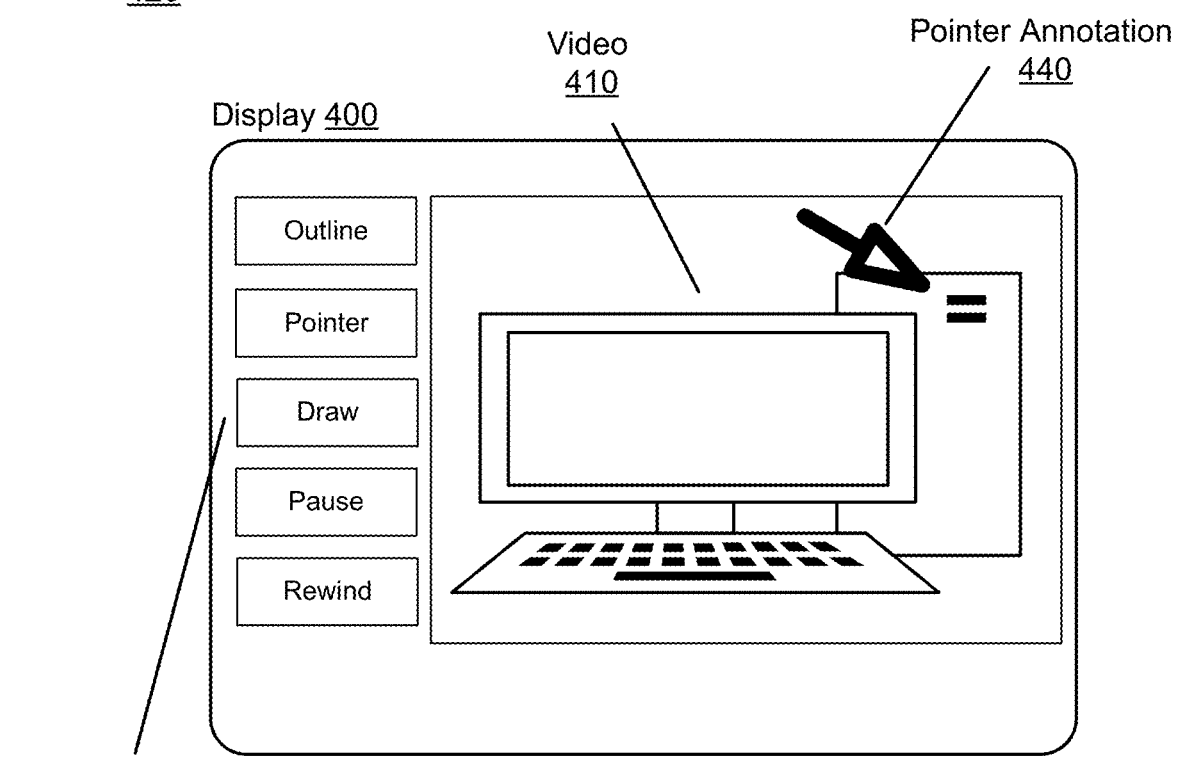
FIG. 4B illustrates a remote-controlled video messaging interface including a pointer annotation, according to an embodiment.
Figure 4C:
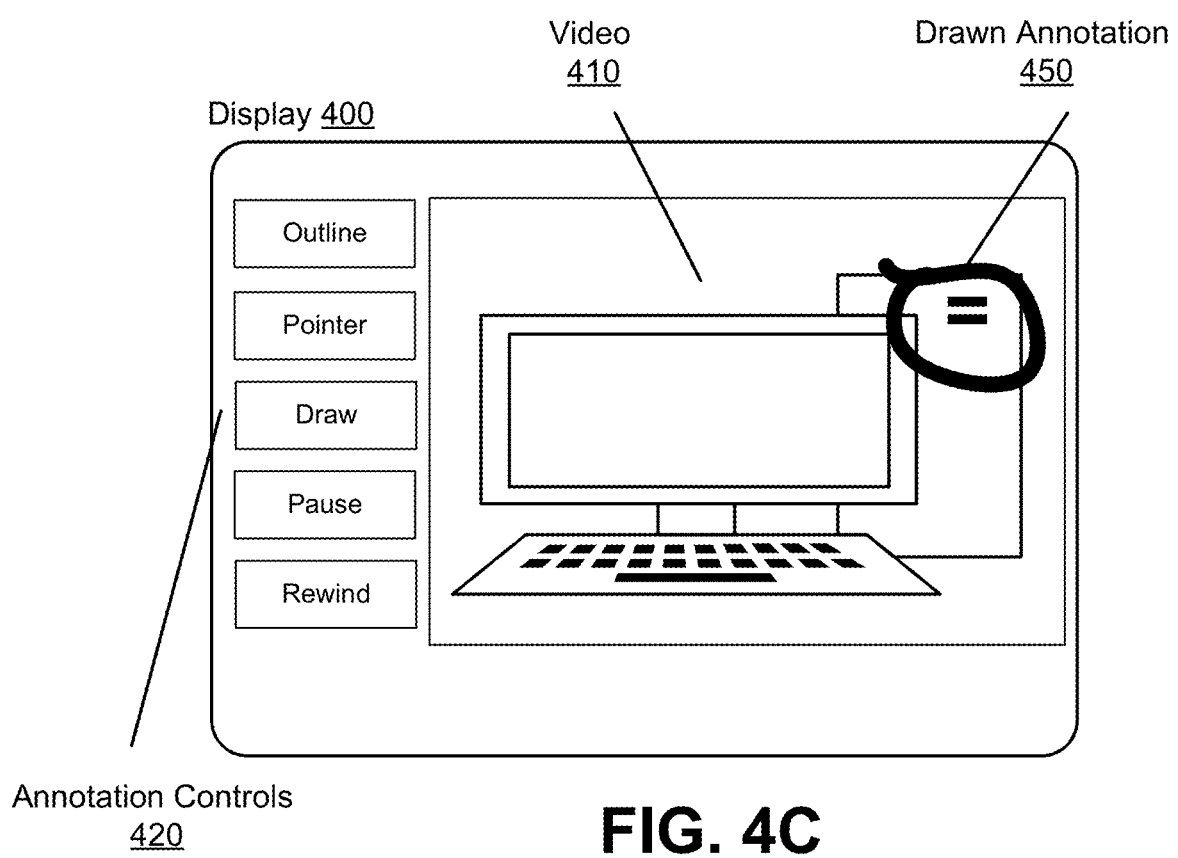
FIG. 4C illustrates a remote-controlled video messaging interface including a drawn annotation, according to an embodiment.

FIGS. 4A-4C illustrate a display 400 (e.g., the client display 114 or the remote display 132) displaying remote-controlled video messaging interfaces with example annotations as part of a video messaging session (e.g., the video messaging session 300). Similar to the client and remote interfaces depicted in FIG. 3, the video messaging interface displayed by the display 400 includes a video 410 and annotation controls 420. The example annotations discussed below are described in the context of being added to the video 410 by a user interacting with the annotation controls 420. However, the example annotations may also have been added to the video 410 based on instructions received from another device connected to the video messaging session, as described above.

FIG. 4A illustrates a remote-controlled video messaging interface with an outline annotation 430 of the video 410, according to an embodiment. The outline annotation 430 may have been dragged and dropped on the video 410 by a user interacting with the annotation controls 420 (e.g., the client user or the remote user). The user may further be able to adjust or edit the outline annotation 430, such as rotating, expanding, contracting, coloring, or performing other visual alterations of the outline annotation 430.

FIG. 4B illustrates a remote-controlled video messaging interface including a pointer annotation 440 of the video 410, according to an embodiment. As with the outline annotation 430, the pointer annotation 440 may have been dragged and dropped on the video 410 by a user interacting with the annotation controls 420 (e.g., the client user or the remote user). Alternatively, the pointer annotation 440 may correspond to a cursor controlled by the user (e.g., using a mouse, a finger, etc.). The user may further be able to adjust or edit the pointer annotation 440 similarly to the to the outline annotation 430. As used herein, a cursor refers to any visual indicator used to show a position on a display of a device (e.g., the client display 114 or the remote display 132) specified by an interaction from a user with the device.

FIG. 4C illustrates a remote-controlled video messaging interface including a drawn annotation 450, according to an embodiment. The drawn annotation 450 may have been drawn on the video 410 by a user interacting with the annotation controls 420, such as drawing on the video 410 with a cursor, stylus, finger, or the like. The user may further be able to adjust or edit the drawn annotation 450 similarly to the to the outline annotation 430 and the pointer annotation 440.

In other embodiments than those depicted in FIGS. 4A-4C, the display 400 displays a video messaging interface including different and/or additional types of annotations and corresponding annotation controls. In particular, the video messaging interface may provide for three-dimensional annotations instead of (or in addition to) the two-dimensional annotations depicted in FIGS. 4A-4C. Three-dimensional annotations may include augmented reality content, such as three-dimensional objects positioned within the video 410 so as to appear in the environment captured by the video 410 (e.g., an outline, pointer, highlight, drawing, or other three-dimensional shape in the video 410 which appears to remain in the same position in the environment as the camera 112 capturing the video 410 moves).

Video Messaging Session with Video Annotations

Figure 5:
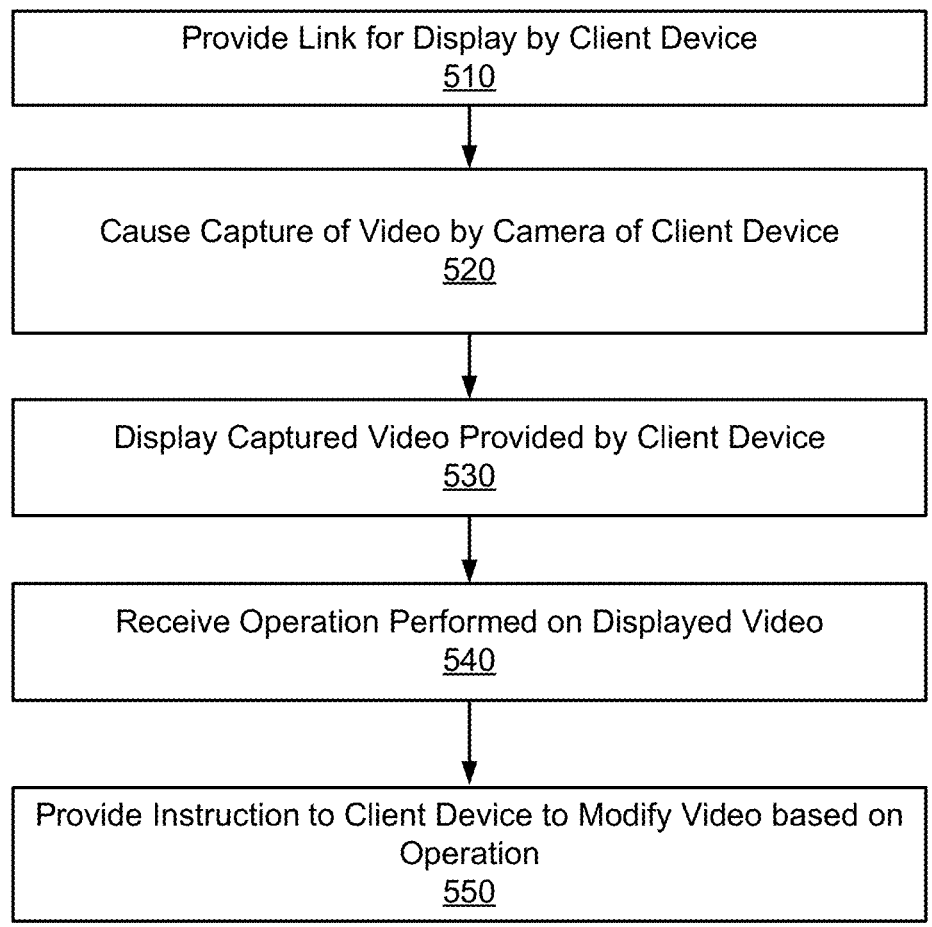
FIG. 5 is a flow diagram illustrating a method for executing a remote-controlled video messaging session, according to an embodiment.

FIG. 5 is a flow diagram of a method for executing a remote-controlled video messaging session, according to an embodiment. The remote device 130 provides 510 a link for display by the client device 110. For example, the remote device 130 may receive a request to initiate a video messaging session from the client device 110. In this case, the remote device 130 may initialize a video messaging session and provide a link (e.g., a URL) to the client device 110 to enable to client device 110 to connect to the video messaging session. In response to a selection of the link by a user of the client device 110, the remote device 130 causes 520 a camera of the client device 110 to capture video. The client device 110 may display the captured video on a screen of the client device 110 (e.g., the client display 114). After receiving the captured video from the client device 110, the remote device 130 displays 530 the captured video provided by the client device 110 on a screen of the remote device 130 (e.g., the remote display 132).

The remote device 130 then receives 540 an operation performed on the displayed video by a user of the remote device 130. For example, the remote user may modify the captured video to include one or more annotations, pause the video, rewind the video, or perform any of the other operations described herein. Based on the operation, the remote device 130 provides 550 instructions to the client device 110 to modify the video based on the operation. For example, the remote device 130 may provide instructions to the client device 110 to modify the video displayed by the client device 110 in order to mirror modifications to the video displayed by the remote device 130.

ADDITIONAL CONSIDERATIONS

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for detecting and mitigating system breaches. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

The invention claimed is:

1. A method comprising:
providing, by a remote device, a link for display by a client device;
in response to a selection of the link, causing capture of video by a camera of the client device, the client device configured to display the captured video on a screen of the client device and to provide the captured video to the remote device for display, the client device configured to buffer one or more frames of the captured video;
displaying, by the remote device, the captured video provided by the client device on a screen associated with the remote device;
receiving, by the remote device, an operation performed on the video displayed by the remote device from a user of the remote device, wherein the received operation comprises an operation to rewind the captured video to a buffered frame from the one or more frames; and
providing, by the remote device to the client device, an instruction associated with the received operation including an identifier of the buffered frame, the client device configured to modify the video displayed by the client device based on the instruction, the modifying including rewinding the captured video for playback beginning at the buffered frame using the identifier.

2. The method of claim 1, further comprising:
in response to a second operation performed on the video displayed by the client device, receiving, by the remote device, a second instruction associated with the second operation provided by the client device; and
modifying, by the remote device, the video displayed by the remote device based on the second instruction.

3. The method of claim 2, wherein the second operation is performed via an interface displayed by the client device.

4. The method of claim 1, wherein causing capture of video by the camera further comprises:
in response to the selection of the link, providing an interface for display to the client device requesting the captured video; and
in response to an interaction with the interface by a user of the client device, providing, by the remote device, an instruction to initiate the capture of the video by the client device.

5. The method of claim 1, further comprising:
recording, by the remote device, one or more frames of the captured video provided by the client device, the one or more frames including the modified video.

6. The method of claim 1, further comprising:
providing, by the remote device, a second link for display on an additional device;
in response to a selection of the link, providing, by the remote device, a portion of the captured video to the additional device for display.

7. The method of claim 1, further comprising:
determining, by the remote device, a network connection speed for a network connection of the client device; and
responsive to determining the network connection speed is below a threshold speed, providing, by the remote device, a second instruction to the client device, the client device configured to display a recommendation to re-configure the network connection of the client device based on the second instruction.

8. The method of claim 1, wherein the remote device is configured to perform a video stabilization operation on the captured video provided by the client device before displaying the captured video.

9. The method of claim 1, further comprising:
receiving, by the remote device, a second operation performed on the video displayed by the remote device from the user of the remote device, wherein the received second operation comprises an instruction to add an annotation to the video displayed by the client device.

10. The method of claim 9, wherein the annotation comprises one of: a graphical highlight, an augmented reality annotation, an outline, or an indication to a portion of the displayed video.

11. The method of claim 1, further comprising:
receiving, by the remote device, a second operation performed on the video displayed by the remote device from the user of the remote device, wherein the received second operation comprises an instruction to move a cursor on the video displayed by the client device.

12. The method of claim 1, further comprising:
receiving, by the remote device, a second operation performed on the video displayed by the remote device from the user of the remote device, wherein the received second operation comprises an instruction to stop or freeze the displayed video.

13. The method of claim 1, wherein the link comprises a URL included within a text message, an email, a web page, or an application interface.

14. The method of claim 1, wherein the captured video is provided to the remote device in real-time via an internet video communication protocol.

15. The method of claim 1, wherein the client device comprises one of: a mobile device, a tablet computer, a laptop computer, or another computing device.

16. The method of claim 1, wherein the remote device comprises one of: a computer terminal, a mobile device, a tablet computer, a laptop computer, a web server, or another computing device.

17. The method of claim 1, wherein the operation is performed via an interface displayed by the remote device.

18. A non-transitory computer-readable storage medium storing executable computer instructions, the instructions configured to, when executed by a hardware processor, perform steps comprising:
   providing, by a remote device, a link for display by a client device;
   in response to a selection of the link, causing capture of video by a camera of the client device, the client device configured to display the captured video on a screen of the client device and to provide the captured video to the remote device for display, the client device configured to buffer one or more frames of the captured video;
   displaying, by the remote device, the captured video provided by the client device on a screen associated with the remote device;
   receiving, by the remote device, an operation performed on the video displayed by the remote device from a user of the remote device, wherein the received operation comprises an operation to rewind the captured video to a buffered frame from the one or more frames; and
   providing, by the remote device to the client device, an instruction associated with the received operation including an identifier of the buffered frame, the client device configured to modify the video displayed by the client device based on the instruction, the modifying including rewinding the captured video for playback beginning at the buffered frame using the identifier.

19. The computer-readable storage medium of claim 18, wherein the instructions are further configured to perform steps comprising:
   in response to a second operation performed on the video displayed by the client device, receiving, by the remote device, a second instruction associated with the second operation provided by the client device; and
   modifying, by the remote device, the video displayed by the remote device based on the second instruction.

20. The computer-readable storage medium of claim 18, wherein causing capture of video by the camera further comprises:
   in response to the selection of the link, providing an interface for display to the client device requesting the captured video; and
   in response to an interaction with the interface by a user of the client device, providing, by the remote device, an instruction to initiate the capture of the video by the client device.

\* \* \* \* \*